US012643833B2

(12) United States Patent (10) Patent No.: US 12,643,833 B2
Jarman et al. (45) Date of Patent: Jun. 2, 2026

(54) CERAMIC INFILTRATION OF AIRCRAFT BRAKES VIA INJECTION FOR WEAR IMPROVEMENT

(71) Applicant: GOODRICH CORPORATION, Charlotte, NC (US)

(72) Inventors: Jecee Jarman, Pueblo, CO (US); Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 83 days.

(21) Appl. No.: 18/483,429

(22) Filed: Oct. 9, 2023

(65) Prior Publication Data

US 2025/0115524 A1 Apr. 10, 2025

(51) Int. Cl.
*C04B 41/45* (2006.01)
*C04B 41/00* (2006.01)
*C04B 111/00* (2006.01)

(52) U.S. Cl.
CPC ........ *C04B 41/457* (2013.01); *C04B 41/0072* (2013.01); *C04B 41/4515* (2013.01); *C04B 41/4549* (2013.01); *C04B 2111/00362* (2013.01); *C04B 2235/616* (2013.01)

(58) Field of Classification Search
CPC .............. C04B 41/457; C04B 41/4572; C04B 41/4578; C04B 41/455
See application file for complete search history.

(56) References Cited

U.S. PATENT DOCUMENTS

| | | | |
|---|---|---|---|
| 3,871,934 A | 3/1975 | Marin | |
| 4,180,622 A | 12/1979 | Burkhard et al. | |
| 5,224,572 A | 7/1993 | Smolen, Jr. et al. | |
| 5,629,101 A | 5/1997 | Watremez | |
| 5,962,135 A | 10/1999 | Walker et al. | |
| 6,857,509 B1 | 2/2005 | Braiato et al. | |
| 6,969,546 B2 | 11/2005 | DiChiara, Jr. | |
| 7,501,181 B2 | 3/2009 | Walker et al. | |
| 7,900,751 B2 | 3/2011 | Walker | |
| 8,084,089 B2 | 12/2011 | Meckel | |

(Continued)

FOREIGN PATENT DOCUMENTS

| | | |
|---|---|---|
| CN | 110305504 | 10/2020 |
| CN | 110981518 | 1/2021 |

(Continued)

OTHER PUBLICATIONS

European Patent Office, Partial European Search Report dated Mar. 13, 2025 in Application No. 24202523.7.

(Continued)

*Primary Examiner* — Robert A Vetere
(74) *Attorney, Agent, or Firm* — SNELL & WILMER L.L.P.

(57) ABSTRACT

A method for infiltrating a wear liner is disclosed herein. The method includes infiltrating a ceramic solution into a carbon/carbon (C/C) substrate, drying the C/C substrate to produce oxide particulates within the C/C substrate, and densifying the C/C substrate, including heating the C/C substrate and oxide particulates to a first temperature, wherein heating the C/C substrate during the densifying avoids promoting a reaction between the oxide particulates and the C/C substrate.

15 Claims, 4 Drawing Sheets

400

RECEIVE A C/C SUBSTRATE —402

↓

INJECT A "SOL" INTO THE C/C SUBSTRATE —404

↓

DRY THE SOL INFILTRATED C/C SUBSTRATE —406

↓

DENSIFY THE SOL INFILTRATED C/C SUBSTRATE —408

↓

INSTALL THE SOL INFILTRATED C/C DISK IN A MULTI-DISK BRAKE SYSTEM —410

(56) References Cited

U.S. PATENT DOCUMENTS

| | | | | |
|---|---|---|---|---|
| 8,449,943 | B2 | 5/2013 | Meckel | |
| 8,871,044 | B2 | 10/2014 | Baud et al. | |
| 8,962,083 | B2 | 2/2015 | Murphy | |
| 9,272,950 | B2 | 3/2016 | Waghray et al. | |
| 9,296,660 | B2 | 3/2016 | Miyamoto et al. | |
| 9,970,497 | B2 | 5/2018 | Le Costaouec et al. | |
| 10,670,099 | B2 | 6/2020 | Yaguchi et al. | |
| 10,767,059 | B2 | 9/2020 | Poteet et al. | |
| 11,448,274 | B2 | 9/2022 | Kirkpatrick | |
| 11,530,727 | B2 | 12/2022 | Bouillon et al. | |
| 11,634,213 | B2 | 4/2023 | Poteet et al. | |
| 2009/0130324 | A1 | 5/2009 | Shanker et al. | |
| 2010/0291373 | A1 | 11/2010 | Baud et al. | |
| 2012/0118685 | A1 | 5/2012 | Johnson et al. | |
| 2013/0116109 | A1* | 5/2013 | Ritti | C04B 35/80 264/642 |
| 2013/0337180 | A1* | 12/2013 | Jacquemard | C04B 35/632 427/372.2 |
| 2014/0054810 | A1 | 2/2014 | Cho | |
| 2015/0354936 | A1 | 12/2015 | Thomas et al. | |
| 2019/0092698 | A1* | 3/2019 | Kirkpatrick | F16D 69/023 |
| 2020/0200227 | A1* | 6/2020 | Linck | F16D 69/023 |
| 2021/0362368 | A1* | 11/2021 | Diss | C04B 35/10 |
| 2023/0150884 | A1 | 5/2023 | Khan | |
| 2025/0075759 | A1 | 3/2025 | Jarman et al. | |
| 2025/0102032 | A1 | 3/2025 | Jarman | |
| 2025/0116308 | A1 | 4/2025 | Jarman et al. | |

FOREIGN PATENT DOCUMENTS

| | | |
|---|---|---|
| CN | 109384470 | 6/2021 |
| CN | 113045324 | 6/2021 |
| CN | 110937910 | 9/2021 |
| CN | 115385711 | 11/2022 |
| CN | 113277869 | 3/2023 |
| CN | 115773321 | 3/2023 |
| EP | 1845075 | 10/2007 |
| EP | 3248957 | 11/2017 |
| EP | 3459923 | 3/2019 |
| EP | 3805187 | 4/2021 |
| EP | 4180408 | 5/2023 |
| EP | 4223725 | 8/2023 |
| FR | 2967170 | 5/2012 |
| GB | 2485673 | 5/2012 |
| JP | H0551286 | 3/1993 |
| JP | 07043930 | 3/2022 |
| WO | 2008075055 | 6/2008 |
| WO | 2009127517 | 10/2009 |

OTHER PUBLICATIONS

European Patent Office, European Search Report dated Feb. 5, 2025 in Application No. 241987270.

European Patent Office, European Search Report dated Feb. 19, 2025 in Application No. 242030484.

European Patent Office, European Search Report dated Feb. 25, 2025 in Application No. 242050847.

USPTO; Requirement for Restriction/ Election dated Mar. 4, 2025 in U.S. Appl. No. 18/461,433.

European Patent Office, European Search Report dated Jun. 5, 2025 in Application No. 24202523.7.

USPTO; Non-Final Office Action dated May 21, 2025 in U.S. Appl. No. 18/461,433.

USPTO; Non-Final Office Action dated Aug. 21, 2025 in U.S. Appl. No. 18/474,607.

USPTO; Non-Final Office Action dated Sep. 4, 2025 in U.S. Appl. No. 18/483,367.

European Patent Office, European Search Report dated Jun. 12, 2025 in Application No. 24202053.5.

USPTO; Notice of Allowance dated Oct. 21, 2025 in U.S. Appl. No. 18/461,433.

USPTO; Notice of Allowance dated Dec. 1, 2025 in U.S. Appl. No. 18/461,433.

USPTO; Notice of Allowance dated Dec. 17, 2025 in U.S. Appl. No. 18/474,607.

USPTO; Notice of Allowance dated Jan. 16, 2026 in U.S. Appl. No. 18/474,607.

USPTO; Non-Final Office Action dated Apr. 9, 2026 in U.S. Appl. No. 18/489,329.

* cited by examiner

400

RECEIVE A C/C SUBSTRATE — 402

INJECT A "SOL" INTO THE
C/C SUBSTRATE — 404

DRY THE SOL INFILTRATED
C/C SUBSTRATE — 406

DENSIFY THE SOL
INFILTRATED
C/C SUBSTRATE — 408

INSTALL THE SOL
INFILTRATED
C/C DISK IN A MULTI-DISK
BRAKE SYSTEM — 410

CERAMIC INFILTRATION OF AIRCRAFT BRAKES VIA INJECTION FOR WEAR IMPROVEMENT

FIELD

The present disclosure generally relates to aircraft braking systems and, more specifically, to ceramic particulate infiltrations for wear improvement of the aircraft braking system.

BACKGROUND

Aircraft typically utilize brake systems on wheels to slow or stop the aircraft during landings, taxiing, and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

SUMMARY

A method for infiltrating a wear liner is disclosed herein. The method includes infiltrating a ceramic solution into a carbon/carbon (C/C) substrate, drying the C/C substrate to produce oxide particulates within the C/C substrate, and densifying the C/C substrate, including heating the C/C substrate and oxide particulates to a first temperature, wherein heating the C/C substrate during the densifying avoids promoting a reaction between the oxide particulates and the C/C substrate.

In various embodiments, the C/C substrate is a C/C preform that is configured for use as a C/C disk or a C/C wear liner for a core-liner brake configuration after densifying the C/C substrate. In various embodiments, infiltrating the ceramic solution into the C/C substrate includes submerging the C/C substrate in a bath of the ceramic solution and applying a vacuum to vacuum infiltrate the ceramic solution to a core of the C/C substrate. In various embodiments, the ceramic solution comprises at least one of nano ceramic binary oxide particulates, doped nano ceramic binary oxide particulates, or nano ceramic ternary oxide particulates.

In various embodiments, the nano ceramic binary oxide particulates comprise at least one of magnesium oxide (MgO), aluminum oxide ($Al_2O_3$), silicon oxide ($SiO_2$), calcium oxide (CaO), scandium (III) oxide ($Sc_2O_3$), titanium oxide ($TiO_2$), gallium oxide (GaO), strontium oxide (SrO), yttrium oxide ($Y_2O_3$), zirconium oxide ($ZrO_2$), hafnium (IV) oxide ($HfO_2$), tantalum oxide ($Ta_2O_5$), lanthanum oxide ($La_2O_3$), cerium dioxide ($CeO_2$), praseodymium (III,IV) oxide ($Pr_6O_{11}$), neodymium oxide ($Nd_2O_3$), samarium oxide ($Sm_2O_3$), europium oxide ($Eu_2O_3$), or gadolinium oxide ($Gd_2O_3$).

In various embodiments, the doped nano ceramic binary oxide particulates comprise at least one of yttrium oxide stabilized zirconium (IV) oxide (YSZ) or zirconium (IV) oxide toughened aluminum oxide (ZTA) in various embodiments and wherein the nano ceramic ternary oxide particulates comprise at least one of hafnium orthosilicate (HfSiO$_4$), aluminum titanate ($Al_2TiO_5$), calcium titanate (CaTiO$_3$), strontium titanate (SrTiO$_3$), barium titanate (Ba- TiO$_3$), hafnium titanate (HfTiO$_4$), strontium zirconate (SrZrO$_3$), or barium zirconate (BaZrO$_3$).

Also disclosed herein is a method of infiltrating a ceramic solution into a carbon/carbon (C/C) substrate. The method includes injecting, via a needle, the ceramic solution into the C/C substrate, wherein the needle penetrates a thickness of the C/C substrate, drying the C/C substrate to produce oxide particulates within the C/C substrate, and densifying the C/C substrate, including heating the C/C substrate and oxide particulates to a first temperature, wherein heating the C/C substrate during the densifying avoids promoting a reaction between the oxide particulates and the C/C substrate.

In various embodiments, the C/C substrate is a C/C preform that is configured for use as a C/C disk or a C/C wear liner for a core-liner brake configuration after densifying the C/C substrate, and wherein the drying the C/C substrate dries the ceramic solution to produce oxide particulates within the C/C substrate. In various embodiments, the injecting include the needle penetrating up to an entire thickness of the C/C substrate and injecting the ceramic solution up to the entire thickness of the C/C substrate, or wherein the injecting includes injecting the ceramic solution at discrete depths through a thickness of the C/C substrate, the discrete depths being distinct from each other, or wherein the injecting includes injecting the ceramic solution with a gradient through a depth of the wear liner, the ceramic solution being more concentrated near a core of the wear liner and less concentrated near a surface of the wear liner, or wherein the injecting includes injection the ceramic solution into a plurality of localized regions of the wear liner, the plurality of localized regions spaced a circumferential distance from each other.

In various embodiments, the ceramic solution comprises at least one of nano ceramic binary oxide particulates, doped nano ceramic binary oxide particulates, or nano ceramic ternary oxide particulates.

In various embodiments, the nano ceramic binary oxide particulates comprise at least one of magnesium oxide (MgO), aluminum oxide ($Al_2O_3$), silicon oxide ($SiO_2$), calcium oxide (CaO), scandium (III) oxide ($Sc_2O_3$), titanium oxide ($TiO_2$), gallium oxide (GaO), strontium oxide (SrO), yttrium oxide ($Y_2O_3$), zirconium oxide ($ZrO_2$), hafnium (IV) oxide ($HfO_2$), tantalum oxide ($Ta_2O_5$), lanthanum oxide ($La_2O_3$), cerium dioxide ($CeO_2$), praseodymium (III,IV) oxide ($Pr_6O_{11}$), neodymium oxide ($Nd_2O_3$), samarium oxide ($Sm_2O_3$), europium oxide ($Eu_2O_3$), or gadolinium oxide ($Gd_2O_3$).

In various embodiments, the doped nano ceramic binary oxide particulates comprise at least one of yttrium oxide stabilized zirconium (IV) oxide (YSZ) or zirconium (IV) oxide toughened aluminum oxide (ZTA). In various embodiments.

In various embodiments, the nano ceramic ternary oxide particulates comprise at least one of hafnium orthosilicate (HfSiO$_4$), aluminum titanate ($Al_2TiO_5$), calcium titanate (CaTiO$_3$), strontium titanate (SrTiO$_3$), barium titanate (Ba-TiO$_3$), hafnium titanate (HfTiO$_4$), strontium zirconate (SrZrO$_3$), or barium zirconate (BaZrO$_3$).

Also disclosed herein is a method of infiltrating a ceramic solution into a densified carbon/carbon (C/C) disk. The method includes drilling a plurality of holes in a wear surface of the densified C/C disk, applying the ceramic solution to the densified C/C disk including entering into the plurality of holes, and drying the densified C/C disk.

In various embodiments, the ceramic solution comprises at least one of nano ceramic binary oxide particulates, doped nano ceramic binary oxide particulates, or nano ceramic ternary oxide particulates.

In various embodiments, the nano ceramic binary oxide particulates comprise at least one of magnesium oxide (MgO), aluminum oxide ($Al_2O_3$), silicon oxide ($SiO_2$), calcium oxide (CaO), scandium (III) oxide ($Sc_2O_3$), titanium oxide ($TiO_2$), gallium oxide (GaO), strontium oxide (SrO), yttrium oxide ($Y_2O_3$), zirconium oxide ($ZrO_2$), hafnium (IV) oxide ($HfO_2$), tantalum oxide ($Ta_2O_5$), lanthanum oxide ($La_2O_3$), cerium dioxide ($CeO_2$), praseodymium (III,IV) oxide ($Pr_6O_{11}$), neodymium oxide ($Nd_2O_3$), samarium oxide ($Sm_2O_3$), europium oxide ($Eu_2O_3$), or gadolinium oxide ($Gd_2O_3$).

In various embodiments, the doped nano ceramic binary oxide particulates comprise at least one of yttrium oxide stabilized zirconium (IV) oxide (YSZ) or zirconium (IV) oxide toughened aluminum oxide (ZTA). In various embodiments.

In various embodiments, the nano ceramic ternary oxide particulates comprise at least one of hafnium orthosilicate ($HfSiO_4$), aluminum titanate ($Al_2TiO_5$), calcium titanate ($CaTiO_3$), strontium titanate ($SrTiO_3$), barium titanate ($BaTiO_3$), hafnium titanate ($HfTiO_4$), strontium zirconate ($SrZrO_3$), or barium zirconate ($BaZrO_3$).

In various embodiments, the drilling includes drilling the plurality of holes to a core of the densified C/C disk. In various embodiments, the applying the ceramic solution includes at least one of injecting the plurality of holes in the densified C/C disk with the ceramic solution, dunking the densified C/C disk in the ceramic solution, or vacuum infiltrating the densified C/C disk in the ceramic solution.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
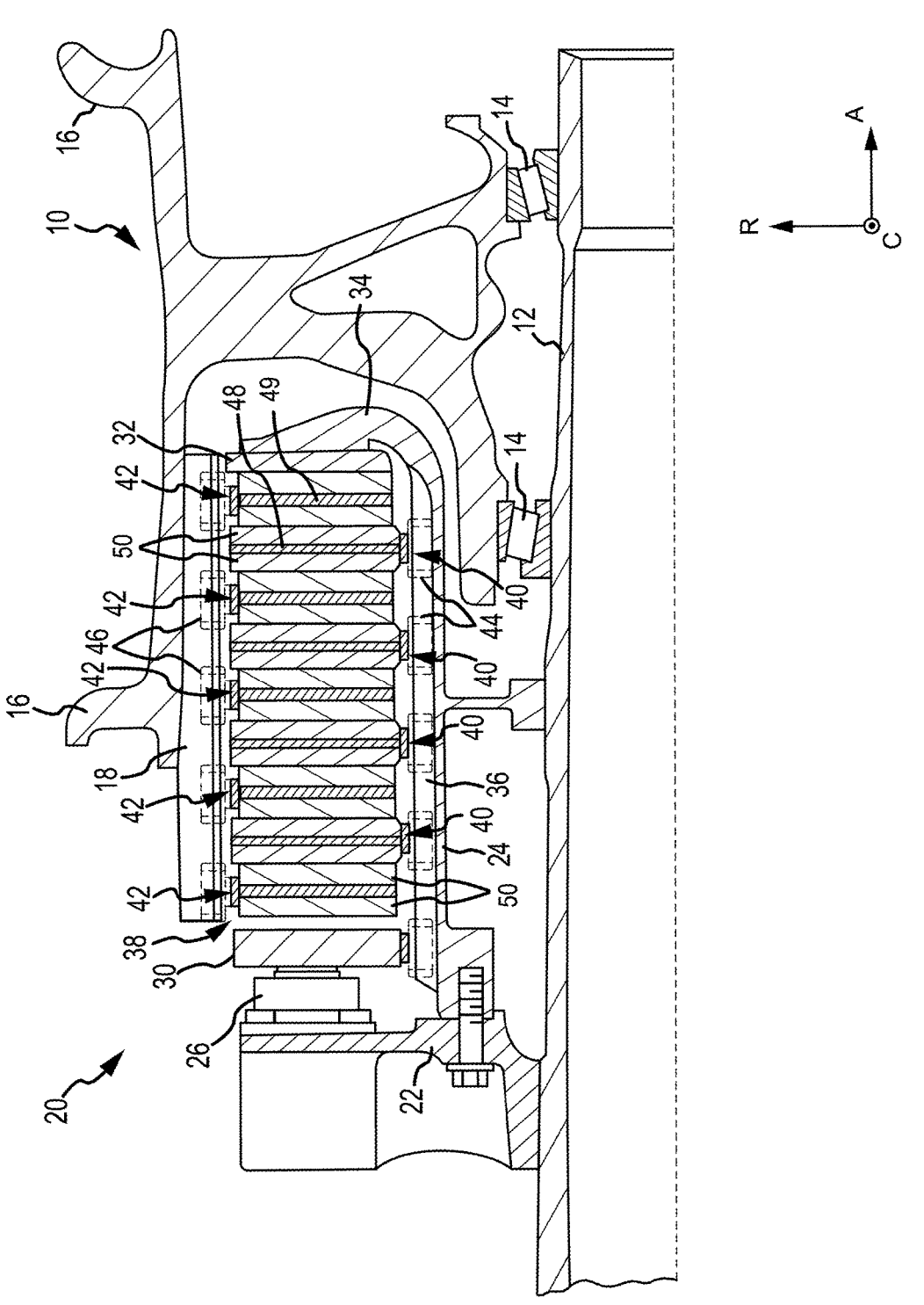
FIG. 1 illustrates a multi-disk brake system, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Carbon/carbon (C/C) composites and silicon carbide (SiC) based ceramic matrix composites (CMCs) have found use in the aerospace and other industries for fabricating brake stacks and heat sinks. These brake stacks or heat sinks may utilize a core-liner concept (CMC core, C/C wear liner). By itself, carbon provides good wear resistance, but only 50-60% of the wear liner will be used before being discarded. Although less of the total disk will need to be replaced, 40-50% of the manufactured carbon may be wasted in the current core-liner setup. In a core-liner configuration where a CMC core is utilized, the CMC is not currently designed to function as a wearing material itself and instead provides thermal management in the brake stack or heat sink. This creates the need for wear liners or wear coatings/layers on the CMC to prevent degradation of the CMC core. Wear liners function as a source which develops beneficial wear debris that lubricates the brake stack or heat sink during operation while wear coatings/layers provides a wear-resistant material which can be ground away and replaced with new coatings as needed.

Provided herein, according to various embodiments, are manufacturing system(s) and method(s) for decreasing brake stack or heat sink wear rate and thus, increasing brake stack or heat sink brake life. In various embodiments, an unfinished C/C substrate is received. In various embodiments, the unfinished C/C substrate may be infiltrated with nano ceramic binary oxide, doped nano ceramic binary oxide particulates, and/or nano ceramic ternary oxide particulates which is suspended in a ceramic solution known as a "sol" by soaking, injecting the sol using a needle, and vacuum infiltration, among others. In various embodiments, a brake disk is received. In various embodiments, where the brake disk is a densified C/C disk, the densified C/C disk may have holes drilled into it, and may be infiltrated with nano ceramic binary oxide, doped nano ceramic binary oxide particulates, and/or nano ceramic ternary oxide particulates which is suspended in a ceramic solution known as a "sol." In various embodiments, the sol may be inserted, or infiltrated, into the disk through the disk via numerous routes such as injecting, soaking, and vacuuming infiltration, among others. In various embodiments, during the operation of the brake, the nano ceramic binary oxide, doped nano ceramic binary oxide, or nano ceramic ternary oxide is mixed into the carbon wear debris as its generated which then has the ability to drastically reduce wear rates and increase brake life. In various embodiments, when other carbon wear debris oxidizes away, the already oxidized ceramics remain without needing to be regenerated like current carbon wear debris and may regenerate carbon wear debris quickly to assist in brake lubrication.

Referring now to FIG. 1, a multi-disk brake system 20 is illustrated, in accordance with various embodiments. The system may include a wheel 10 supported for rotation around axle 12 by bearings 14. Axle 12 defines an axis of multi-disk brake system 20 and the various components thereof. Any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. The plurality of friction disks 38 includes at least one non-rotatable friction disk (stator) 40, and at least one rotatable friction disk (rotor) 42. Stators 40 may include a carbon/carbon (C/C) disk or ceramic matrix composite (CMC) (stator core) 48. Stators 40 may also include wear liners 50 located over opposing sides of a CMC core 48. Rotors 42 may include a carbon/carbon (C/C) disk or ceramic matrix composite (CMC) (rotor core) 49. Rotors 42 may also include wear liners 50 located over opposing sides of a CMC core 49. Each friction disk 38 includes an attachment structure. For example, stators 40 include a plurality of stator lugs 44 at circumferentially spaced positions around an inner circumference of stators 40, and rotors 42 include a plurality of rotor lugs 46 at circumferentially spaced positions around an outer circumference of rotors 42.

In various embodiments, pressure plate 30, end plate 32, wear liners 50, stator core 48, and rotor core 49 are each annular structures made at least partially from a carbon composite material. In various embodiments, friction disk cores 48, 49 and wear liners 50 may comprise different materials. For example, friction disk cores 48, 49 may comprise a first material, for example, C/C or CMC, and wear liners 50 may comprise a second material, for example, a carbon composite material. In various embodiments, friction disk cores 48, 49 and wear liners 50 may comprise the same material. For example, friction disk cores 48, 49 and wear liners 50 may both comprise a carbon composite material. The material of friction disk cores 48, 49 may be selected for its structural properties, thermal conductivity, heat capacity, and/or oxidation resistance properties, and the material of wear liners 50 may be selected for its wear resistance and/or frictional properties. Thus, friction disks 38 may experience the structural advantages of friction disk cores 48, 49 and the frictional advantages of wear liners 50.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 may support the pressure plate 30 such that pressure plate 30 is also non-rotatable. Stator splines 36 also support the stators 40. Stators 40 engage stator splines 36 with gaps formed between stator lugs 44. Similarly, rotors 42 engage rotor splines 18 with gaps formed between rotor lugs 46. Thus, rotors 42 are rotatable by virtue of their engagement with rotor splines 18 of wheel 10.

In various embodiments, rotors 42 are arranged with end plate 32 on one end, pressure plate 30 on the other end, and stators 40 interleaved such that rotors 42 are adjacent to non-rotatable friction components. Pistons 26 are connected to torque flange 22 at circumferentially spaced positions around torque flange 22. Pistons 26 face axially toward wheel 10 and contact a side of pressure plate 30 opposite rotors 42. Pistons 26 may be powered electrically, hydraulically, or pneumatically. In response to actuation of pistons 26, a force towards reaction plate 34 is exerted on friction disks 38 such that rotors 42 and stators 40 are pressed together between pressure plate 30 and end plate 32.

Figure 2:
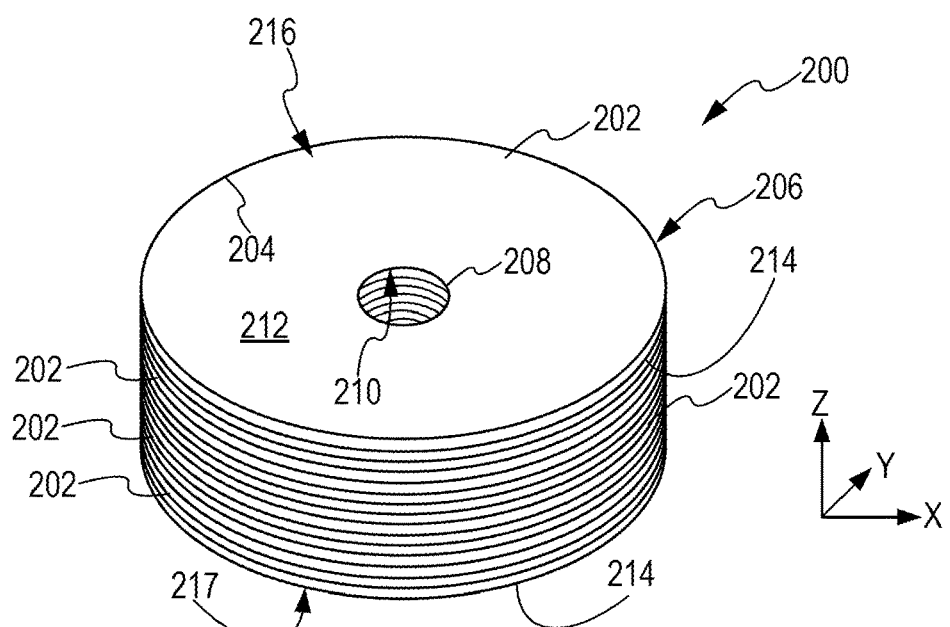
FIG. 2 illustrates a fibrous preform utilized to manufacture a carbon/carbon (C/C) disk, in accordance with various embodiments.

Referring now to FIG. 2, a fibrous preform 200 utilized to manufacture a carbon/carbon (C/C) disk is illustrated, in accordance with various embodiments. Fibrous preform 200 may be employed to form a stator 40 or a rotor 42, as described above. Fibrous preform 200 may comprise a porous structure comprised of a plurality of stacked textile layers 202. Each textile layer 202 having a thickness in a first dimension (i.e., the Z-direction) that may be substantially less than a thickness of the layer 202 in the other two dimensions (i.e., the X-direction and the Y-direction). As used herein, the "in-plane" direction refers to directions parallel to the thicker two dimensions (i.e., parallel to the X and Y directions and perpendicular to the Z-direction).

A porous structure may comprise any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 200 may be prepared by needling the textile layers 202 of fibrous preform 200. Needling the textile layers 202 of fibrous preform 200 tends to push fibers from one layer 202 to the next layer 202, thereby forming z-fibers that extend axially across the layers 202. Needling pulls fibers from the in-plane direction and forces the fibers into the z-fiber direction. After needling, fibrous preform 200 may comprise fibers extending in three different directions: the radial direction, the circumferential direction, and the axial direction (or the X, Y, and Z directions).

Fibrous preform 200 may be fabricated using a net shape preforming technology or may be cut from a needled board. Fibrous preform 200 may be a lay-up of woven, braided or knitted textile layers 202. The fibrous material may be in the form of chopped carbon fibers molded to form layers 202. Prior to the densification process, the fibrous material may be formed into a preform having any desired shape or form. For example, the fibrous preform may be in the form of a disk having any shape such as, for example, a polygon, a cylinder, a triangle, annular, square, rectangle, pentagon, hexagon, octagon, or the like. In various embodiments, layers 202 and fibrous preform 200 may have a generally annular shape. In accordance with various embodiments, the outer circumferential (or outer perimeter) surfaces 204 of layers 202 may form an outer diameter (OD) 206 of fibrous preform 200, and the inner circumferential (or inner perimeter) surfaces 208 of layers 202 may form an inner diameter (ID) 210 of fibrous preform 200. Each layer 202 includes a first axial face 212 and a second axial face 214 opposite the first axial face 212. First and second axial faces 212, 214 extend from outer circumferential surface 204 to inner circumferential surface 208. Layers 202 are stacked such that the first axial face 212 of one layer 202 is oriented toward the second axial face 214 of the adjacent layer 202. First axial face 212 of the uppermost layer 202 forms the upper axial end 216 of fibrous preform 200 and the second axial face 214 of the bottommost layer 202 forms the lower axial end 217 of fibrous preform 200 (i.e., the two layers 202 that are farther apart from one another in the axial direction form the axial ends 216, 217 of the fibrous preform).

Figure 3:
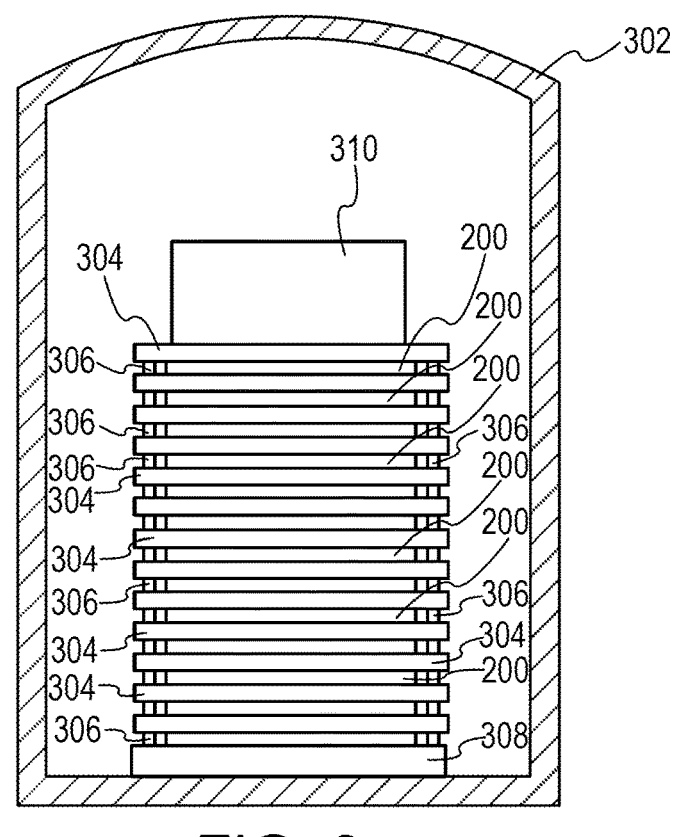
FIG. 3 illustrates a fibrous preform utilized to manufacture a carbon/carbon (C/C) disk in a carbonization furnace, in accordance with various embodiments.

Referring now to FIG. 3, fibrous preform 200 utilized to manufacture a carbon/carbon (C/C) disk being placed in a carbonization furnace 302 for carbonization is illustrated, in accordance with various embodiments. The carbonization process may be employed to convert the fibers of the fibrous preforms 200 into pure carbon fibers, as used herein only "pure carbon fibers" means carbon fibers comprised of at least 99% carbon. The carbonization process is distinguished from the densification process described below in that the densification process involves infiltrating the pores of the fibrous preform 200 and depositing a matrix (e.g., carbon, phenolic resin, or any other desired matrix material) within and around the carbon fibers of the fibrous preform, and the carbonization process refers to the process of converting the fibers of the fibrous preform 200 into pure carbon fibers.

In various embodiments, a plurality of fibrous preforms 200 may be placed on top of one another with separator plates 304 and spacing stops 306 disposed between adjacent fibrous preforms 200. For example, the bottommost fibrous preform 200 may be placed on a base plate 308 at the bottom of carbonization furnace 302. A separator plate 304 may be placed on top of the bottommost fibrous preform 200. Another fibrous preform 200 may then be placed on the separator plate 304, and another separator plate 304 may be placed on that fibrous preform 200. A stack of fibrous preforms 200 and separator plates 304 may be constructed in this manner, with each fibrous preform 200 being separated from superjacent and subjacent fibrous preforms 200 by separator plates 304. Spacing stops 306 may be placed between each of the separator plates 304. The spacing stops 306 may comprise a height that is less than the thickness of the fibrous preform 200 prior to carbonization. Spacing stops 306 may define a target thickness of the fibrous preform 200 after carbonization. In that regard, after the stack of fibrous preforms 200 is constructed, and before the carbonization process has started, gaps may exist between the spacing stops 306 and adjacent separator plates 304. During carbonization, a compressive load may be applied to the fibrous preforms 200, thereby compressing the fibrous preforms 200 until spacing stops 306 contact adjacent separator plates 304.

In various embodiments, compressive pressure may be applied to fibrous preforms 200 during the carbonization. The compressive pressure may be applied by placing a weight 310 over fibrous preforms 200, or by applying a compressive load to the fibrous preforms 200 by other suitable means. The compressive pressure may be applied along the direction of the z-fibers. It will be appreciated by those skilled in the art that the mass of weight 310 and/or the compressive force generated by weight 310 may vary depending on the size of fibrous preforms 200, the pre-carbonization fiber volume of fibrous preforms 200, the desired post-carbonization fiber volume of fibrous preforms 200, and/or the number fibrous preforms 200 being compressed. As used herein, "fiber volume" refers to the percentage of the total volume of the fibrous preform that is formed by the fibers of the fibrous preform. For example, a fiber volume of 18% means the fibers of the fibrous preform form 18% of the total volume of fibrous preform. In various embodiments, after carbonization, fibrous preform 200 includes a fiber volume of between 10% and 30%. In various embodiments, after carbonization, fibrous preform 200 includes a fiber volume of between 15% and 25%. In various embodiments, fibrous preforms 200 having a low fiber volume may be desirable for the infiltration methods disclosed herein. In various embodiments, after carbonization, fibrous preform 200 may comprise a fiber volume of less than 25%. For example, in various embodiments, after carbonization, fibrous preform 200 may comprise a fiber volume of 21% or, in various embodiments, fibrous preform 200 may comprise a fiber volume of 18%. In various embodiments, the carbonized fibrous preform 200 is then densified via chemical vapor infiltration (CVI) with pyrolytic carbon at a predetermined temperature for a predetermined time interval as is known in the art, which results in a densified C/C disk or wear liner.

In various embodiment, a CMC core may be manufactured forming a fibrous preform, densifying the fibrous preform, and performing a silicon melt infiltration. In various embodiments, forming the fibrous preform include disposing a first textile layer on first plate, forming a first ceramic particle layer over a first textile layer disposing a second textile layer over the first ceramic particle layer, forming a second ceramic particle layer over the second textile layer, and disposing a third textile layer over the second ceramic particle layer. Once a desired number of textile layers and ceramic particle layers have been stacked, a second plate is located over the final textile layer. In various embodiments, a compressive load may be applied to the fibrous preform. In various embodiments, the compressive load may be applied during the densification.

In various embodiments, forming a first ceramic particle layer over a first textile layer includes locating a first shim around an outer perimeter of the first textile layer, depositing a boron carbide powder over the first textile layer, and removing any portion of the boron carbide powder that extends above an upper surface of the first shim. In various embodiments, forming a second ceramic particle layer over the second textile layer includes locating a second shim around an outer perimeter of the second textile layer, depositing a boron carbide powder over the second textile layer, and removing any portion of the boron carbide powder that extends above an upper surface of the second shim.

Figure 4:
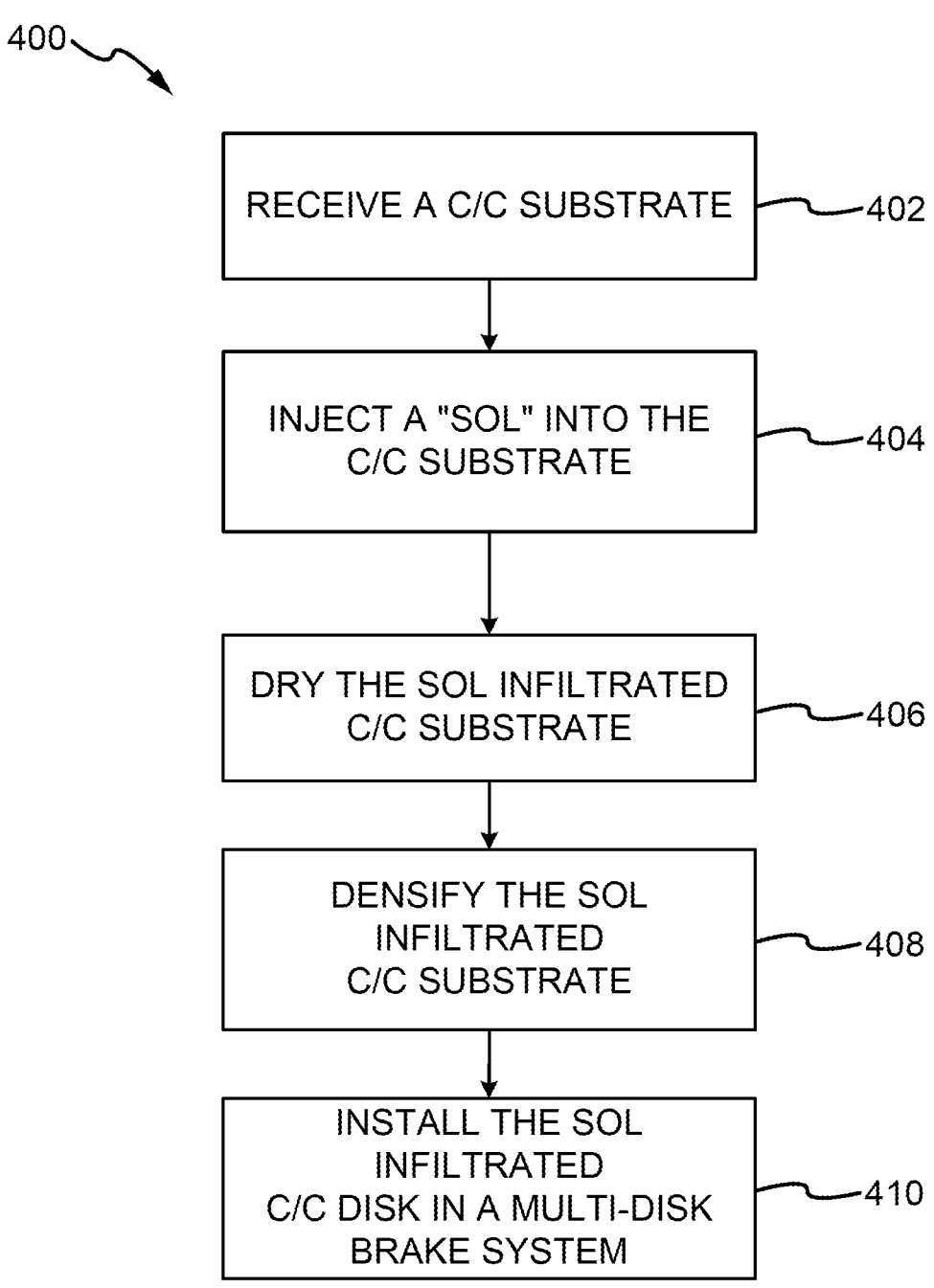
FIG. 4 illustrates a flowchart of a method for infiltrating a ceramic solution into a wear liner via a needle, in accordance with various embodiments.

Referring now to FIG. 4, a flowchart illustrating a method 400 for decreasing brake stack or heat sink wear rate of a carbon/carbon (C/C) disk and thus, increasing brake stack or heat sink brake life of the C/C disk is illustrated, in accordance with various embodiments. At block 402, a carbon/carbon (C/C) substrate is received. In various embodiments, the C/C substrate is a carbon/carbon (C/C) preform that is configured for use as a C/C wear liner or a C/C disk.

At block 404, nano ceramic binary oxide, doped nano ceramic binary oxide, or nano ceramic ternary oxide particulates suspended in a ceramic solution, referred to as a "sol," is injected into the C/C substrate. In various embodiments, the sol is injected throughout the full thickness of the C/C substrate. In various embodiments, the sol may be injected into the C/C substrate with a gradient. That is, in various embodiments, more sol may be injected toward a core, or middle of the thickness, of C/C substrate than is injected near the surfaces of the C/C substrate. In various embodiments, about 2 to about 4 times as much sol may injected into the core of the C/C substrate than is injected near the surfaces of the C/C substrate. In various embodiments, the sol may be injected at discrete depths throughout the entire thickness of the C/C substrate. In various embodiments, the sol may be injected continuously through the entire thickness of the C/C substrate. In various embodiments, the sol is injected through the full circumference of the C/C substrate. In various embodiments, the sol is injected in a plurality of localized regions (i.e., circumferential regions).

In various embodiments, the sol may be injected into the C/C substrate from a single side (i.e., top, bottom, or circumference) of the C/C substrate. In various embodiments, the sol may be injected into the C/C substrate from multiple sides (i.e., top, bottom, and/or circumference) of the C/C substrate. In various embodiments, injecting the sol throughout the entire thickness of the C/C substrate allows the ceramic particles in the sol to self distribute during wear of the C/C substrate.

The sol may be injected to a depth of about 10% to about 95% of a total thickness of the C/C substrate. In various embodiments, the sol may be injected to a depth of about 30% to about 70% of the total thickness of the C/C substrate. In various embodiments, the sol may be injected by a plurality of needles. In various embodiments, the plurality of needles has a density of about 2 needles per square inch to about 10 needles per square inch, and in various embodiments about 4 needles per square inch to about 8 needles per square inch. In various embodiments, the volume of sol injected into the C/C substrate is about 2% to about 20% of the volume of the C/C substrate, and more specifically, about 5% to about 10% of the volume of the C/C substrate.

In various embodiments, the particulates have an average particle size of about 10 nanometers (0.3937 microinch) to about 250 nanometers (9.843 microinches). In various embodiments, the particulates have an average particle size of about 10 nanometers (0.3937 microinch) to about 150 nanometers (5.906 microinches). In various embodiments, the particulates have an average particle size of about 10 nanometers (0.3937 microinch) to about 50 nanometers (1.969 microinches). In various embodiments, during the operation of the brake, the nano ceramic binary oxide, doped nano ceramic binary oxide, or nano ceramic ternary oxide is mixed into the carbon wear debris as its generated which then has the ability to drastically reduce wear rates and increase brake life. In various embodiments, when other carbon wear debris oxidizes away, the already oxidized ceramics remain without needed to be regenerated like current wear debris produced from C/C disks and may regenerate carbon wear debris quickly to assist in brake lubrication.

In various embodiments, the nano ceramic binary oxide particulates comprise at least one of magnesium oxide (MgO), aluminum oxide ($Al_2O_3$), silicon oxide ($SiO_2$), calcium oxide (CaO), scandium (III) oxide ($Sc_2O_3$), titanium oxide ($TiO_2$), gallium oxide (GaO), strontium oxide (SrO), yttrium oxide ($Y_2O_3$), zirconium oxide ($ZrO_2$), hafnium (IV) oxide ($HfO_2$), tantalum oxide ($Ta_2O_5$), lanthanum oxide ($La_2O_3$), cerium dioxide ($CeO_2$), praseodymium (III,IV) oxide ($Pr_6O_{11}$), neodymium oxide ($Nd_2O_3$), samarium oxide ($Sm_2O_3$), europium oxide ($Eu_2O_3$), or gadolinium oxide ($Gd_2O_3$) and various combinations of the same, among others. In various embodiments, the doped nano ceramic binary oxide particulates comprise at least one of yttrium oxide stabilized zirconium (IV) oxide (YSZ) or zirconium (IV) oxide toughened aluminum oxide (ZTA) and various combinations of the same, among others. In various embodiments, the nano ceramic ternary oxide particulates comprise at least one of hafnium orthosilicate ($HfSiO_4$), aluminum titanate ($Al_2TiO_5$), calcium titanate ($CaTiO_3$), strontium titanate ($SrTiO_3$), barium titanate ($BaTiO_3$), hafnium titanate ($HfTiO_4$), strontium zirconate ($SrZrO_3$), or barium zirconate ($BaZrO_3$), and various combinations of the same, among others.

At block 406, the sol infiltrated C/C substrate is heated to dry the sol. In various embodiments, drying the sol infiltrated C/C substrate removes excess liquid (e.g., water) from the C/C substrate so that the C/C substrate is less volatile. In various embodiments, drying the C/C substrate produces oxide particulates within the C/C substrate by heating or volatilizing the functional groups off of the suspended ceramic chemicals within the sol and oxidizing the remaining compound. The sol infiltrated C/C disk may be heated and dried as the heat up portion of a furnace run in the densification process.

At block 408, the sol infiltrated C/C substrate is densified. The densified C/C substrate may be used as a C/C disk or a C/C wear liner. In various embodiments, the sol infiltrated C/C disk is densified using, for example, chemical vapor infiltration (CVI) with pyrolytic carbon at a predetermined temperature for a predetermined time interval as is known in the art. In various embodiments, the heat is managed at a level which avoids a reaction of the respective sol with the carbon in the C/C substrate. At block 410, the sol infiltrated, densified C/C disk may then be installed in a multi-disk brake system, such as the multi-disk brake system 20 of FIG. 1. In various embodiments, during use and wear of the C/C disk the sol infiltrated into the C/C disk may be released to produce wear debris to lubricate the multi-disk brake system.

Figure 5:
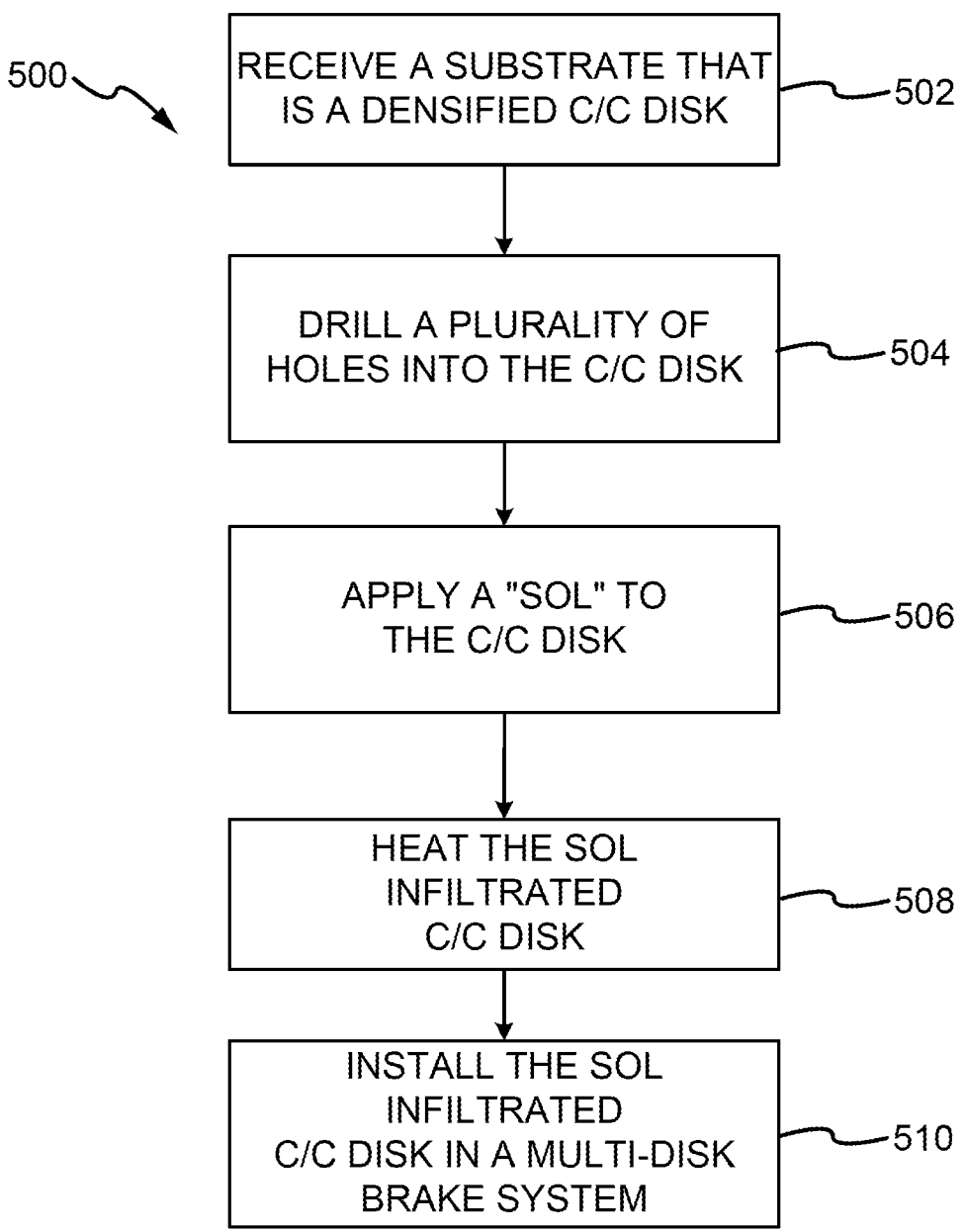
FIG. 5 illustrates a flowchart of a method for infiltrating a ceramic solution into a wear liner by forming a plurality of holes in the wear liner, in accordance with various embodiments.

Referring now to FIG. 5, a flowchart illustrating a method 500 for decreasing brake stack or heat sink wear rate of a C/C disk and thus, increasing brake stack or heat sink brake life of the C/C disk is illustrated, in accordance with various embodiments. At block 502, a brake disk that is a densified C/C disk is received.

At block 504, a plurality of holes are formed in the densified C/C disk. In various embodiments, a drill is used to form the plurality of holes. In various embodiments, the plurality of holes extend a first distance into the densified C/C disk. The first distance may be about $^{60}/_{1000}$ inch (about 0.1524 centimeter) to about $^{200}/_{1000}$ inch (about 0.508 centimeter), and more specifically, about $^{120}/_{1000}$ inch (about 0.3048 centimeter). In various embodiments, one or more of the plurality of holes may be formed to the core of the densified C/C disk (i.e., half the thickness of the densified C/C disk). In various embodiments, each hole of the plurality of holes has a first diameter. The first diameter may be about 500 nm (about 19.69 microinches) to about 1 mm (about 0.03937 inch), and more specifically about 500 μm (about 0.019685 inch). In various embodiments, each hole of the plurality of holes may have a different diameter than each other hole of the plurality of holes. In various embodiments, each hole of the plurality of holes may be a different depth than the other holes of the plurality of holes. In various embodiments, the plurality of holes may be formed through the full circumference of the densified C/C disk. In various embodiments, the plurality of holes may be formed in a plurality of localized regions (i.e., circumferential regions). In various embodiments, the plurality of holes may be formed through a single side (i.e., top, bottom, or circumference) of the densified C/C disk. In various embodiments, the plurality of holes may be formed through multiple sides (i.e., top, bottom, and/or circumference) of the densified C/C disk.

At block 506, nano ceramic binary oxide, doped nano ceramic binary oxide, or nano ceramic ternary oxide particulates suspended in a ceramic solution, referred to as a "sol," is applied to the densified C/C disk. In various embodiments, the densified C/C disk may be sprayed with the sol, dunked in the sol, or have sol injected into the drilled holes in the densified C/C disk, among other methods of applying the sol. In various embodiments, applying the sol throughout the entire thickness of the densified C/C disk using the drilled holes allows the ceramic particles in the sol to self-distribute as wear of the densified C/C disk occurs during operation.

In various embodiments, the particulates have an average particle size of about 10 nanometers (0.3937 microinch) to about 250 nanometers (9.843 microinches). In various embodiments, the particulates have an average particle size of about 10 nanometers (0.3937 microinch) to about 150 nanometers (5.906 microinches). In various embodiments, the particulates have an average particle size of about 10 nanometers (0.3937 microinch) to about 50 nanometers (1.969 microinches). In various embodiments, during the operation of the brake, the nano ceramic binary oxide, doped nano ceramic binary oxide, or nano ceramic ternary oxide is mixed into the carbon wear debris as its generated which then has the ability to drastically reduce wear rates and increase brake life. In various embodiments, when other carbon wear debris oxidizes away, the already oxidized ceramics remain without needed to be regenerated like current wear debris produced from C/C disks and may regenerate carbon wear debris quickly to assist in brake lubrication.

In various embodiments, the nano ceramic binary oxide particulates comprise at least one of magnesium oxide (MgO), aluminum oxide ($Al_2O_3$), silicon oxide ($SiO_2$), calcium oxide (CaO), scandium (III) oxide ($Sc_2O_3$), titanium oxide ($TiO_2$), gallium oxide (GaO), strontium oxide (SrO), yttrium oxide ($Y_2O_3$), zirconium oxide ($ZrO_2$), hafnium (IV) oxide ($HfO_2$), tantalum oxide ($Ta_2O_5$), lanthanum oxide ($La_2O_3$), cerium dioxide ($CeO_2$), praseodymium (III,IV) oxide ($Pr_6O_{11}$), neodymium oxide ($Nd_2O_3$), samarium oxide ($Sm_2O_3$), europium oxide ($Eu_2O_3$), or gadolinium oxide ($Gd_2O_3$) and various combinations of the same, among others. In various embodiments, the doped nano ceramic binary oxide particulates comprise at least one of yttrium oxide stabilized zirconium (IV) oxide (YSZ) or zirconium (IV) oxide toughened aluminum oxide (ZTA) and various combinations of the same, among others. In various embodiments, the nano ceramic ternary oxide particulates comprise at least one of hafnium orthosilicate ($HfSiO_4$), aluminum titanate ($Al_2TiO_5$), calcium titanate ($CaTiO_3$), strontium titanate ($SrTiO_3$), barium titanate ($BaTiO_3$), hafnium titanate ($HfTiO_4$), strontium zirconate ($SrZrO_3$), or barium zirconate ($BaZrO_3$), and various combinations of the same, among others.

At block 508, the sol infiltrated C/C disk is heated to dry the sol. In various embodiments, drying the sol infiltrated C/C disk removes excess liquid (e.g., water) from the C/C disk so that the C/C disk is less volatile. In various embodiments, drying the C/C disk produces oxide particulates within the C/C disk by heating or volatilizing the functional groups off of the suspended ceramic chemicals within the sol and oxidizing the remaining compound. The sol infiltrated C/C disk may be heated and dried as the heat up portion of a furnace run in the densification process.

At block 510, the dried sol coated C/C disk may then be installed in a multi-disk brake system, such as the multi-disk brake system 20 of FIG. 1. In various embodiments, during use and wear of the C/C disk the plurality of holes may act as a reservoir for providing ceramic material to lubricate the multi-disk brake system and to store already produced wear debris to be used again.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
   infiltrating a ceramic solution into a carbon/carbon (C/C) substrate, the ceramic solution comprising doped nano ceramic binary oxide particulates and nano ceramic ternary oxide particulates, wherein the doped nano ceramic binary oxide particulates comprise at least one of yttrium oxide stabilized zirconium (IV) oxide (YSZ) or zirconium (IV) oxide toughened aluminum oxide (ZTA), and wherein the nano ceramic ternary oxide particulates comprise at least one of hafnium orthosilicate (HfSiO$_4$), aluminum titanate (Al$_2$TiO$_5$), calcium titanate (CaTiO$_3$), strontium titanate (SrTiO$_3$), barium titanate (BaTiO$_3$), hafnium titanate (HfTiO$_4$), strontium zirconate (SrZrO$_3$), or barium zirconate (BaZrO$_3$);
   drying the C/C substrate to produce oxide particulates within the C/C substrate; and
   densifying the C/C substrate, including heating the C/C substrate and oxide particulates to a first temperature, wherein heating the C/C substrate during the densifying avoids promoting a reaction between the oxide particulates and the C/C substrate.

2. The method of claim 1, wherein the C/C substrate is a C/C preform that is configured for use as a C/C disk or a C/C wear liner for a core-liner brake configuration after densifying the C/C substrate.

3. The method of claim 1, wherein infiltrating the ceramic solution into the C/C substrate comprises:
   submerging the C/C substrate in a bath of the ceramic solution; and
   applying a vacuum to vacuum infiltrate the ceramic solution to a core of the C/C substrate.

4. The method of claim 1, further comprising nano ceramic binary oxide particulates, wherein the nano ceramic binary oxide particulates comprise at least one of magnesium oxide (MgO), aluminum oxide (Al$_2$O$_3$), silicon oxide (SiO$_2$), calcium oxide (CaO), scandium (III) oxide (Sc$_2$O$_3$), titanium oxide (TiO$_2$), gallium oxide (GaO), strontium oxide (SrO), yttrium oxide (Y$_2$O$_3$), zirconium oxide (ZrO$_2$), hafnium (IV) oxide (HfO$_2$), tantalum oxide (Ta$_2$O$_5$), lanthanum oxide (La$_2$O$_3$), cerium dioxide (CeO$_2$), praseodymium (III, IV) oxide (Pr$_6$O$_{11}$), neodymium oxide (Nd$_2$O$_3$), samarium oxide (Sm$_2$O$_3$), europium oxide (Eu$_2$O$_3$), or gadolinium oxide (Gd$_2$O$_3$).

5. A method of infiltrating a ceramic solution into a carbon/carbon (C/C) substrate, comprising:
   injecting, via a needle, the ceramic solution into the C/C substrate, wherein the needle penetrates a thickness of the C/C substrate, wherein the ceramic solution comprises at least one of doped nano ceramic binary oxide particulates or nano ceramic ternary oxide particulates, wherein the doped nano ceramic binary oxide particulates comprise at least one of yttrium oxide stabilized zirconium (IV) oxide (YSZ) or zirconium (IV) oxide toughened aluminum oxide (ZTA), and wherein the nano ceramic ternary oxide particulates comprise at least one of hafnium orthosilicate (HfSiO$_4$), aluminum titanate (Al$_2$TiO$_5$), calcium titanate (CaTiO$_3$), strontium titanate (SrTiO$_3$), barium titanate (BaTiO$_3$), hafnium titanate (HfTiO$_4$), strontium zirconate (SrZrO$_3$), or barium zirconate (BaZrO$_3$);
   drying the C/C substrate to produce oxide particulates within the C/C substrate, wherein the injecting includes injecting the ceramic solution with a gradient through a depth of the C/C substrate; and
   densifying the C/C substrate, including heating the C/C substrate and oxide particulates to a first temperature, wherein heating the C/C substrate during the densifying avoids promoting a reaction between the oxide particulates and the C/C substrate.

6. The method of claim 5, wherein the C/C substrate is a C/C preform that is configured for use as a C/C disk or a C/C wear liner for a core-liner brake configuration after densifying the C/C substrate, and wherein the drying the C/C substrate dries the ceramic solution to produce oxide particulates within the C/C substrate.

7. The method of claim 5,
   wherein the injecting includes the needle penetrating up to an entire thickness of the C/C substrate and injecting the ceramic solution up to the entire thickness of the C/C substrate.

8. The method of claim 5, wherein the injecting includes injecting the ceramic solution at discrete depths through a thickness of the C/C substrate, the discrete depths being distinct from each other.

9. The method of claim 5, wherein the C/C substrate is configured for a core-liner brake configuration after densifying the C/C substrate, and
   wherein the gradient is through a depth of the C/C wear liner, the ceramic solution being more concentrated near a core of the C/C wear liner and less concentrated near a surface of the C/C wear liner.

10. The method of claim 5, wherein the C/C substrate is configured for a core-liner brake configuration after densifying the C/C substrate, and
   wherein the injecting includes injection the ceramic solution into a plurality of localized regions of the wear liner, the plurality of localized regions spaced a circumferential distance from each other.

11. The method of claim 5, wherein the ceramic solution further comprises nano ceramic binary oxide particulates.

12. A method of infiltrating a ceramic solution into a densified carbon/carbon (C/C) disk, comprising:

drilling a plurality of holes in a wear surface of the densified C/C disk;

applying the ceramic solution to the densified C/C disk, with the ceramic solution entering into the plurality of holes, wherein the ceramic solution comprises doped nano ceramic binary oxide particulates and nano ceramic ternary oxide particulates, wherein the doped nano ceramic binary oxide particulates comprise at least one of yttrium oxide stabilized zirconium (IV) oxide (YSZ) or zirconium (IV) oxide toughened aluminum oxide (ZTA), and wherein the nano ceramic ternary oxide particulates comprise at least one of hafnium orthosilicate ($HfSiO_4$), aluminum titanate ($Al_2TiO_5$), calcium titanate ($CaTiO_3$), strontium titanate ($SrTiO_3$), barium titanate ($BaTiO_3$), hafnium titanate ($HfTiO_4$), strontium zirconate ($SrZrO_3$), or barium zirconate ($BaZrO_3$); and drying the densified C/C disk.

13. The method of claim 12, wherein the ceramic solution further comprises nano ceramic binary oxide particulates, wherein the nano ceramic binary oxide particulates comprise at least one of magnesium oxide (MgO), aluminum oxide ($Al_2O_3$), silicon oxide ($SiO_2$), calcium oxide (CaO), scandium (III) oxide ($Sc_2O_3$), titanium oxide ($TiO_2$), gallium oxide (GaO), strontium oxide (SrO), yttrium oxide ($Y_2O_3$), zirconium oxide ($ZrO_2$), hafnium (IV) oxide ($HfO_2$), tantalum oxide ($Ta_2O_5$), lanthanum oxide ($La_2O_3$), cerium dioxide ($CeO_2$), praseodymium (III,IV) oxide ($Pr_6O_{11}$), neodymium oxide ($Nd_2O_3$), samarium oxide ($Sm_2O_3$), europium oxide ($Eu_2O_3$), or gadolinium oxide ($Gd_2O_3$).

14. The method of claim 12, wherein the drilling includes drilling the plurality of holes to a core of the densified C/C disk.

15. The method of claim 12, wherein the applying the ceramic solution includes at least one of injecting the plurality of holes in the densified C/C disk with the ceramic solution, dunking the densified C/C disk in the ceramic solution, or vacuum infiltrating the densified C/C disk in the ceramic solution.

* * * * *